United States Patent
Masuda

(10) Patent No.: US 9,528,889 B2
(45) Date of Patent: Dec. 27, 2016

(54) MAGNETIC LOAD SENSOR UNIT AND ELECTRIC BRAKE SYSTEM

(71) Applicant: Yui Masuda, Shizuoka (JP)

(72) Inventor: Yui Masuda, Shizuoka (JP)

(73) Assignee: NTN CORPORATION, Osaka (JP)

( * ) Notice: Subject to any disclaimer, the term of this patent is extended or adjusted under 35 U.S.C. 154(b) by 176 days.

(21) Appl. No.: 14/413,713

(22) PCT Filed: Jul. 9, 2013

(86) PCT No.: PCT/JP2013/068724
§ 371 (c)(1),
(2) Date: Jan. 9, 2015

(87) PCT Pub. No.: WO2014/010582
PCT Pub. Date: Jan. 16, 2014

(65) Prior Publication Data
US 2015/0204736 A1    Jul. 23, 2015

(30) Foreign Application Priority Data

Jul. 11, 2012    (JP) ................. 2012-155528

(51) Int. Cl.
*G01L 1/12*    (2006.01)
*G01L 1/25*    (2006.01)
(Continued)

(52) U.S. Cl.
CPC .............. *G01L 1/12* (2013.01); *F16D 55/225* (2013.01); *F16D 65/18* (2013.01); *F16D 66/00* (2013.01);
(Continued)

(58) Field of Classification Search
CPC .............. G01L 1/12; G01L 5/22; G01L 1/122; F16D 2066/005
(Continued)

(56) References Cited

U.S. PATENT DOCUMENTS 5,355,714 A * 10/1994 Suzuki et al. ...... B60C 23/0408
336/30
6,005,199 A    12/1999 Harada et al.
(Continued)

FOREIGN PATENT DOCUMENTS

CN    103765178 A    4/2014
EP    2 738 532 A1    6/2014
(Continued)

OTHER PUBLICATIONS

International Search Report issued Sep. 3, 2013 in International (PCT) Application No. PCT/JP2013/068724, pp. 4.
(Continued)

*Primary Examiner* — Lisa Caputo
*Assistant Examiner* — Roger Hernandez-Prewit
(74) *Attorney, Agent, or Firm* — Wenderoth, Lind & Ponack, L.L.P.

(57) ABSTRACT

A load sensor unit is provided which is less likely to suffer from hysteresis errors. The magnetic load sensor unit includes a flange member, a support member supporting the flange member from the axially rearward side, a magnetic target fixed to the flange member, a magnetic sensor fixed to the support member. The magnitude of the load is detected based on the magnetic flux detected by the magnetic sensor. A load acting surface of the flange member to which the load is applied is formed at a position offset axially rearwardly relative to an axially forward surface of the flange member.

14 Claims, 14 Drawing Sheets

(51) Int. Cl.
  *F16D 65/18* (2006.01)
  *G01L 5/22* (2006.01)
  *F16D 55/225* (2006.01)
  *G01L 5/00* (2006.01)
  *F16D 66/00* (2006.01)
  *F16D 121/24* (2012.01)
  *F16D 125/50* (2012.01)

(52) U.S. Cl.
  CPC ............ *G01L 1/122* (2013.01); *G01L 5/0038* (2013.01); *G01L 5/22* (2013.01); *F16D 2066/005* (2013.01); *F16D 2121/24* (2013.01); *F16D 2125/50* (2013.01)

(58) Field of Classification Search
  USPC ................................................ 73/862.69, 132
  See application file for complete search history.

(56) References Cited

U.S. PATENT DOCUMENTS 6,507,187 B1 * 1/2003 Olivas et al. ............ G01B 7/24
                                                324/207.21

| | | |
|---|---|---|
| 2004/0187591 A1 | 9/2004 | Baumann et al. |
| 2007/0107531 A1 | 5/2007 | Munz et al. |
| 2012/0103733 A1 | 5/2012 | Sekiguchi |
| 2014/0191627 A1 | 7/2014 | Takahashi et al. |
| 2014/0224038 A1 | 8/2014 | Masuda et al. |
| 2014/0283635 A1 | 9/2014 | Masuda et al. |

FOREIGN PATENT DOCUMENTS

| | | |
|---|---|---|
| EP | 2 767 812 A1 | 8/2014 |
| JP | 57-190436 | 12/1982 |
| JP | 58-201041 A | 11/1983 |
| JP | 2004-301835 A | 10/2004 |
| JP | 2006-514306 A | 4/2006 |
| JP | 2010-265971 A | 11/2010 |
| WO | 2011/030839 A1 | 3/2011 |

OTHER PUBLICATIONS

European Search Report issued Jul. 31, 2015 in corresponding European Patent Application 13817176.4, pp. 9.

* cited by examiner (a)

(b)

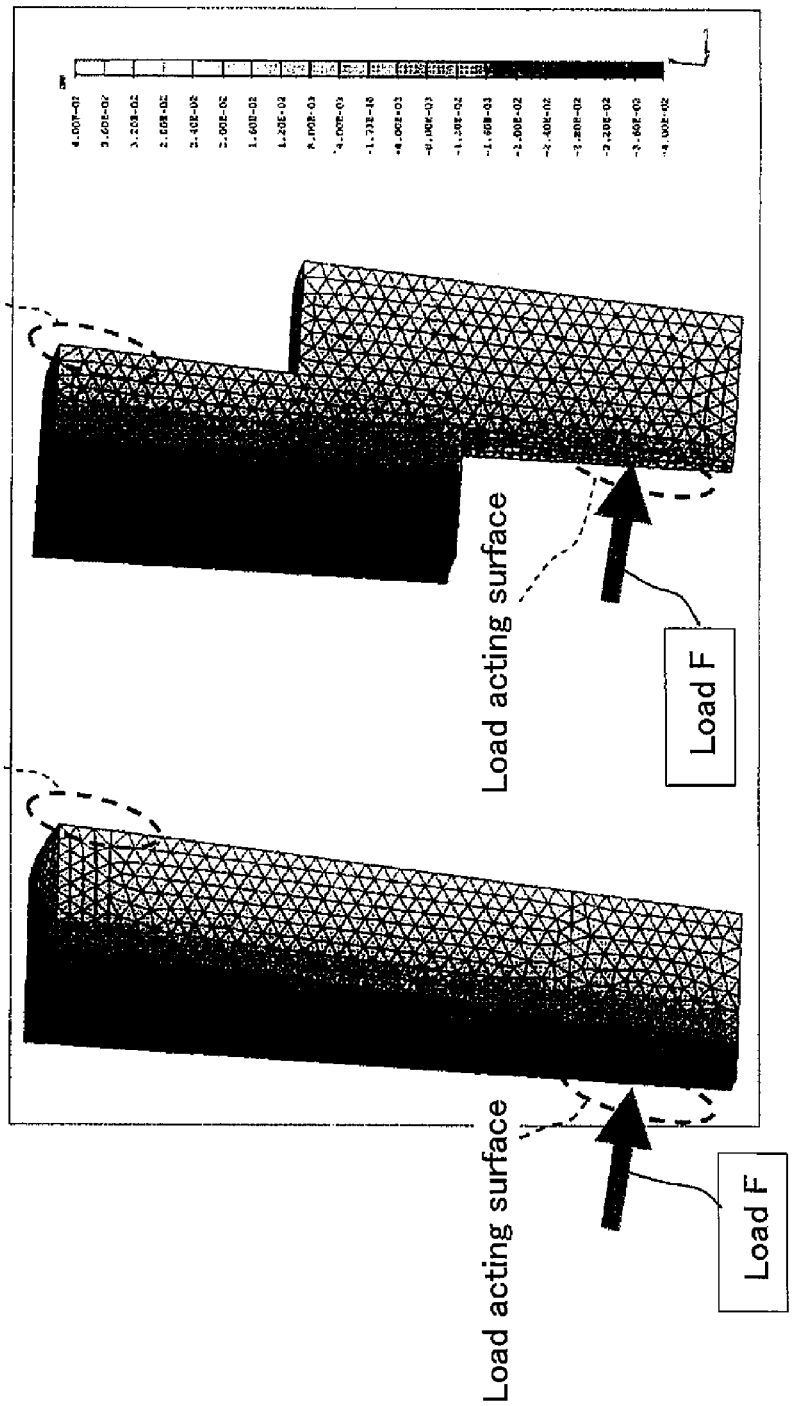

MAGNETIC LOAD SENSOR UNIT AND ELECTRIC BRAKE SYSTEM

TECHNICAL FIELD

The present invention relates to a magnetic load sensor unit and an electric brake system including the magnetic load sensor unit.

BACKGROUND ART

Electric brake systems typically include a mechanism for converting the rotary motion of an electric motor to a linear motion of a friction pad in the axial direction to press the friction pad against a brake disk, thereby generating a braking force. In order to control the braking force to a desired magnitude, a load sensor unit is mounted in many of such electric brake systems at a portion where a reaction force of the load applied to the friction pad is received. The largest load applied to the load sensor unit (i.e., to the friction pad) is about 30 kN. For the purpose of improving the responsiveness of braking, it is preferred that a load sensor unit be used which is capable of detecting the applied load with a minimum displacement of its movable parts.

An example of the load sensor unit capable of detecting a large load with a minimum displacement of its movable parts is disclosed in the below-identified Patent Document 1. This load sensor unit comprises a pair of opposed annular pressure plates, piezoelectric crystal elements sandwiched between both opposed pressure plates, insulating plates each electrically insulating one of the opposed pressure plates from the piezoelectric crystal element, and a lead wire through which the voltage generated by the piezoelectric crystal elements is extracted.

When an axial load is applied to the load sensor unit disclosed in Patent Document 1, the load generates a compressive stress in the piezoelectric crystal elements, and a voltage corresponding to the magnitude of the stress is thereby generated in the piezoelectric crystal elements. Therefore, by measuring the voltage generated in the piezoelectric crystal elements, the magnitude of the load can be detected. Since the displacement of the pressure plates due to the deformation of the piezoelectric crystal elements is minute, the responsiveness of the braking is not compromised when the sensor unit is mounted in to the electric brake system.

However, since this load sensor unit is designed such that the piezoelectric crystal elements directly receive the load applied, there is a possibility that one or more of the piezoelectric crystal elements may chip or crack when an impact load or a load oblique to the axial direction is applied thereto. Further, since the applied load also acts on the insulating plates each electrically insulating one of the opposed pressure plates from the piezoelectric element, high durability is required for the insulating plates. It is therefore difficult to use an inexpensive insulating material such as resin for the insulating plate because such an inexpensive insulating material is insufficient in durability.

In view of this, the present inventors have investigated for a load sensor unit which is capable of detecting a large load with a minimum displacement of its movable Parts and which is excellent in durability, and have developed in-house a load sensor unit shown in FIG. 15.

A load sensor unit 80 shown in FIG. 15 comprises a flange member 2, a support member 3, a magnetic target 4, and a magnetic sensor 5. The flange member 2 is supported by the support member 3 from the axially rearward side, at a position offset radially outwardly from the input position of the load, so that the flange member is deflected when a load is applied from the axially forward side. The magnetic target 4 is fixed to the flange member 2. The magnetic sensor 5 is fixed to the support member 3 so that it can detect a magnetic flux generated by the magnetic target 4.

When a load is applied to the flange member 2 of the load sensor unit 80 from the axially forward side, the magnetic target 4 and the magnetic sensor 5 move relative to each other due to the deflection of the flange member 2. This relative displacement between the magnetic target 4 and the magnetic sensor 5 causes a change in the output signal of the magnetic sensor 5, corresponding to the magnitude of the relative displacement. As a result, the magnitude of the load can be detected based on the output signal of the magnetic sensor 5. With this arrangement, when a load is applied to the load sensor unit 80, the load acts on the flange member 2 to cause deflection in the flange member 2, but it does not act on the magnetic sensor 5. Therefore, the load sensor unit is less likely to malfunction even if an impact load or a load oblique to the axial direction is applied, thereby ensuring a high durability.

PRIOR ART DOCUMENTS

Patent Documents

Patent Document 1: WO 2011/030839

SUMMARY OF THE INVENTION

Problems to be Solved by the Invention

The present inventors have actually made a load sensor unit shown in FIG. 15 for trial, and performed experiments to detect axial loads, using an electric brake system including this load sensor unit. The experiments revealed that hysteresis errors could occur in the values of the detected load, while the load (and thus the degree of deflection of the flange member 2) is increasing and decreasing.

Further, the present inventors have investigated for causes of hysteresis errors and found out the following. When the flange member 2 is deflected, the deflection causes a load acting surface 6 of the flange member 2 to move slightly in the radial direction. This slight slippage on the load acting surface 6 due to the displacement of the flange member 2 causes the hysteresis errors.

An object of the present invention is to provide a load sensor unit which is less likely to suffer from hysteresis errors.

Means for Solving the Problems

The present inventors performed experiments to apply an axial load from the axially forward side to the flange member 2 shown in FIG. 15, and analyzed the displacement of various sites of the flange member 2 in the radial direction. The analysis revealed that, as shown in FIG. 16(a), while the axially forward surface of the flange member 2 moves radially inwardly and the axially rearward surface of the flange member 2 moves radially outwardly, the site between the axially forward surface and the axially rearward surface of the flange member 2 (i.e., the intermediate site in the axial direction) scarcely moves in the radial direction. They have therefore focused on the point that, by disposing the load acting surface 6 between the axially forward surface and the axially rearward surface of the flange member 2, the slippage on the load acting surface 6 can be reduced.

In view of the above consideration, the present invention provides:

A magnetic load sensor unit comprising: a flange member configured to be deflected when a load is applied to the flange member from the axially forward side; a support member supporting the flange member from the axially rearward side at a position radially offset from the input position of the load; a magnetic target which generates a magnetic flux; and a magnetic sensor for detecting the magnetic flux generated by the magnetic target; wherein one of the magnetic target and the magnetic sensor is fixed to the flange member and the other of the magnetic target and the magnetic sensor is fixed to the support member, such that the magnetic target and the magnetic sensor move relative to each other due to deflection of the flange member when the load is applied to the flange member, whereby the magnitude of the load is detected based on the magnetic flux detected by the magnetic sensor; and wherein the flange member is formed with a load acting surface of the flange member to which the load is applied at a position offset axially rearwardly relative to an axially forward surface of the portion of the flange member supported by the support member.

With this arrangement, since the load acting surface of the flange member is offset axially rearwardly relative to the axially forward surface of the flange member, the displacement of the load acting surface in the radial direction upon deflection of the flange member can be reduced to a low level. Thus, when a load is applied to the flange member, the slippage on the load acting surface is reduced, thereby preventing hysteresis errors due to the slippage on the load acting surface.

Further, it is preferred that a supported surface of the flange member supported by the support member be formed at a position offset axially forwardly relative to the axially rearward surface of the portion of the flange member to which the load is applied. With this arrangement, since the supported surface of the flange member is offset axially forwardly relative to the axially rearward surface of the flange member, the displacement of the supported surface in the radial direction upon deflection of the flange member can also be reduced to a low level. Thus, when a load is applied to the flange member, the slippage on the supported surface is reduced, thereby preventing hysteresis errors due to the slippage on the supported surface.

The load acting surface of the flange member to which the load is applied, and the axially forward surface of the portion of the flange member supported by the support member, may be two flat surfaces connected together through a step. If a rounded corner portion having a circular arc-shaped cross section is formed so as to smoothly connect the load acting surface of the flange member and the step on the forward surface side of the flange member, the concentration of tensile stress to the position where the load acting surface of the flange member intersects the step can be prevented when a load is applied to the flange member, thereby ensuring the durability of the flange member.

Further, the supported surface of the flange member supported by the support member, and the axially rearward surface of the portion of the flange member to which the load is applied may be two flat surfaces connected together through a step. If a recessed groove having a circular arc-shaped cross section is formed at the position where the supported surface of the flange member intersects the step on the rearward surface side of the flange member, the concentration of compressive stress to the position where the supported surface of the flange member intersects the step can be prevented when a load is applied to the flange member, thereby ensuring the durability of the flange member.

When the load acting surface of the flange member to which the load is applied and the supported surface of the flange member supported by the support member are formed such that both surfaces exist on a single plane, slippage on the load acting surface and of the supported surface when a load is applied to the flange member can be reduced extremely efficiently. The expression "to exist on single plane" does not necessary mean that the load acting surface and the supported surface of the flange member exist precisely on a single plane in a mathematical sense. It merely means that the load acting surface and the supported surface exist within a virtual plane-like region having a thickness of about 10% of the thickness of the portion of the flange member to which the load is applied.

The magnetic target preferably comprises a plurality of permanent magnets aligned in the axial direction, wherein the permanent magnets are magnetized in the direction perpendicular to the axial direction, in which the magnetic target and the magnetic sensor move relative to each other. The magnetic sensor is preferably disposed in the vicinity of the boundary between the adjacent magnetic poles of the permanent magnets.

With this arrangement, the output signal of the magnetic sensor changes steeply when the magnetic target and the magnetic sensor move relative to each other in the axial direction, while the output signal of the magnetic sensor scarcely changes when the magnetic target and the magnetic sensor move in the direction other than the axial direction, relative to each other. Thus, the output signal of the magnetic sensor is less likely to be influenced by the external vibrations, so that the magnitude of the load can be detected stably and accurately.

The support member may comprise an annular support portion supporting the axially rearward surface of the radially outer end portion of the flange member, and a fitting cylindrical portion provided on the radially outer side of the support portion so as to be fitted to the outer periphery of the flange member with an interference fit. With this arrangement, the flange member is integrated with the support member, so that the magnetic load sensor unit can be easily handled. At the same time, since the fitting cylindrical portion is fitted to the flange member with an interference fit, the slippage between the fitting cylindrical portion and the flange member upon deflection of the flange member is less likely to occur, and hysteresis errors due to the slippage between the fitting surfaces of the fitting cylindrical portion and the flange member can be prevented.

Further, the present invention provides an electric brake system comprising the above described magnetic load sensor unit.

Effect of the Invention

In the magnetic load sensor unit of the present invention, the displacement of the load acting surface in the radial direction upon deflection of the flange member can be reduced to a low level, since the load acting surface of the flange member is offset axially rearwardly relative to the axially forward surface of the flange member. Therefore, the magnetic load sensor unit is less likely to suffer from hysteresis errors due to the slippage on the load acting surface, when a load is applied to the flange member.

BRIEF DESCRIPTION OF THE DRAWINGS

FIG. 16(a) is the displacement analysis result of the magnetic load sensor unit of the comparative example shown in FIG. 15, showing the displacement of various sites of the flange member in the radial direction when an axial load is applied thereto; and FIG. 16(b) is the displacement analysis result of the magnetic load sensor unit shown in FIG. 1, showing the displacement of various sites of the flange member in the radial direction when an axial load is applied thereto.

MODE FOR CARRYING OUT THE INVENTION

Figure 1:
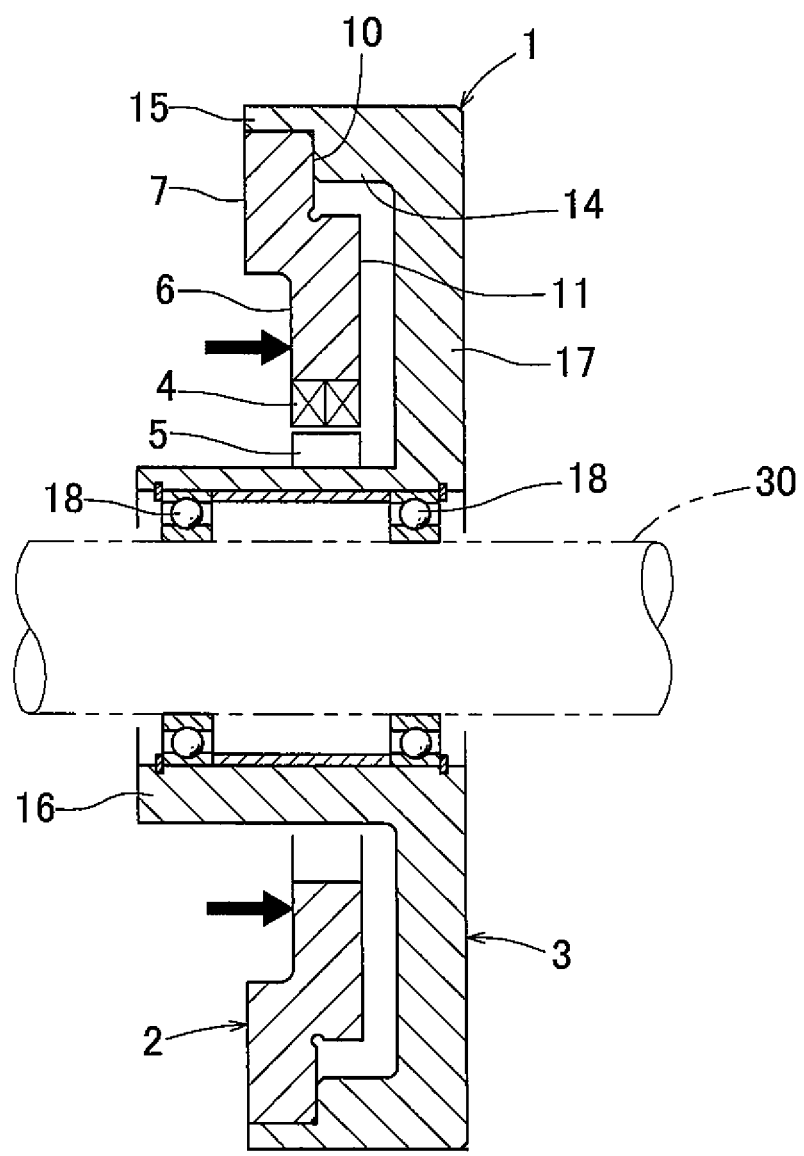
FIG. 1 is a cross sectional view of a magnetic load sensor unit according to a first embodiment of the present invention.
Figure 2:
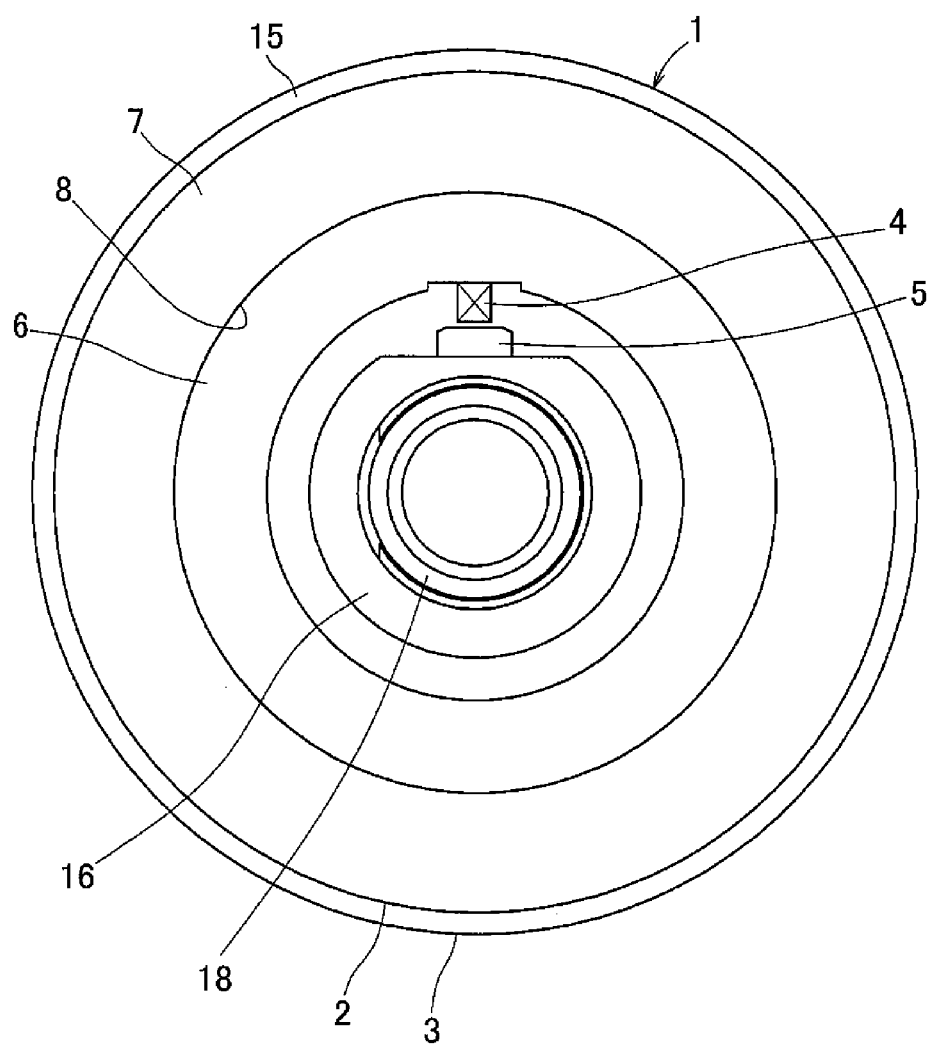
FIG. 2 is a left side view of the magnetic load sensor unit shown in FIG. 1.
Figure 3:
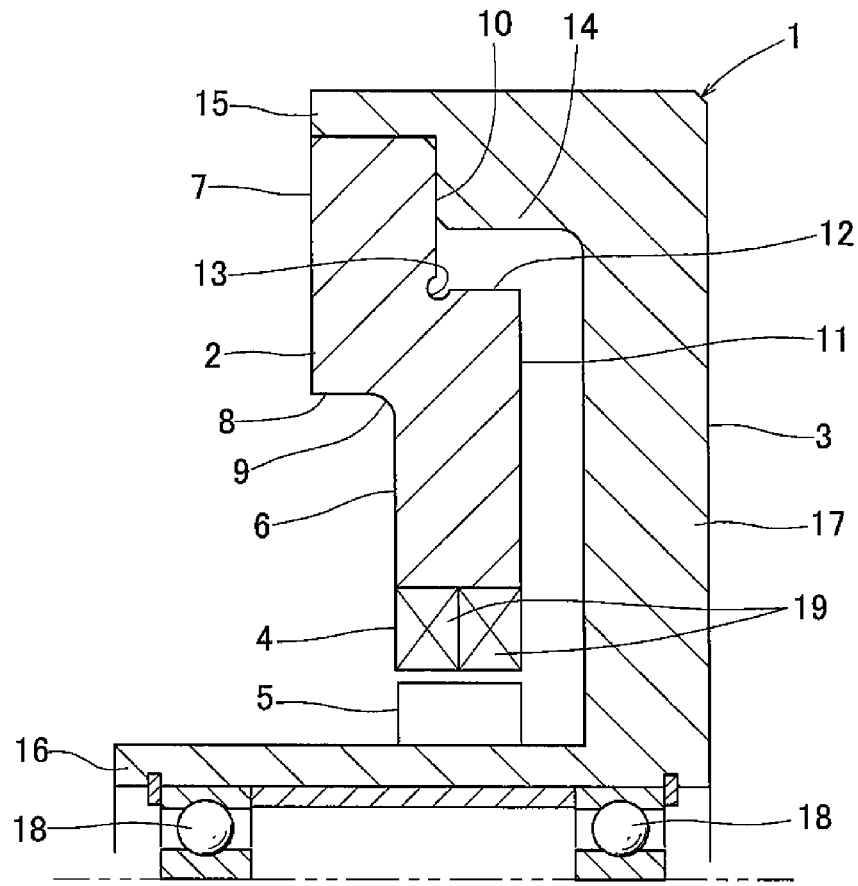
FIG. 3 is an enlarged cross sectional view of the magnetic load sensor unit shown in FIG. 1, showing the vicinity of the magnetic target.

FIGS. 1 to 3 show a magnetic load sensor unit 1 according to a first embodiment of the present invention. This magnetic load sensor unit 1 comprises a flange member 2 configured to be deflected when a load is applied from the axially forward side, a support member 3 supporting the flange member 2 from the axially rearward side, a magnetic target 4 which generates a magnetic flux, and a magnetic sensor 5 for detecting the magnetic flux generated by the magnetic target 4.

The flange member 2 is a member in the shape of an annular plate made of a metal or metals, such as iron. A load acting surface 6 to which a load is applied is formed on an axially forward surface of the radially inner portion of the flange member 2. The load acting surface 6 is a flat surface perpendicular to the axial direction, and is formed at a position offset axially rearwardly relative to an axially forward surface 7 of the portion of the flange member 2 supported by the support member 3. By this offset, the load acting surface 6 is disposed so as to exist in the region between the axially forward end and the axially rearward end of the flange member 2 (i.e., the axially intermediate region of the flange member 2).

As shown in FIG. 3, the load acting surface 6, and the axially forward surface 7 of the portion of the flange member 2 supported by the support member 3 are connected together through a step 8. A rounded corner portion 9 having a circular arc-shaped cross section is formed between, and smoothly connects together, the load acting surface 6 and the step 8. The rounded corner portion 9 prevents the concentration of tensile stress to the position where the load acting surface 6 of the flange member 2 intersects the step 8, when an axial load is applied to the flange member 2 from the axially forward side, thereby ensuring the durability of the flange member 2.

A supported surface 10 supported by the support member 3 is formed on the axially rearward surface of the radially outer portion of the flange member 2. The supported surface 10 is a flat surface perpendicular to the axial direction, and is formed at a position offset axially forwardly relative to an axially rearward surface 11 of the portion of the flange member 2 to which a load is applied. By this offset, the supported surface 10 is disposed so as to exist in the region between the axially forward end and the axially rearward end of the flange member 2 (i.e., the axially intermediate region of the flange member 2).

The supported surface 10, and the axially rearward surface 11 of the portion of the flange member 2 to which the load is applied are connected together through a step 12. A recessed groove 13 is formed at the position where the supported surface 10 intersects the step 12. The recessed groove 13 has a circular arc-shaped cross section and extends in the circumferential direction. The recessed groove 13 prevents the concentration of compressive stress to the position where the supported surface 10 of the flange member 2 intersects the step 12, when an axial load is applied to the flange member 2 from the axially forward side, thereby ensuring the durability of the flange member 2.

The support member 3 is made of the same metal or metals as the flange member 2. The support member 3 comprises an annular support portion 14 supporting the axially rearward surface 11 of the radially outer end portion of the flange member 2, a cylindrical fitting portion 15 provided on the radially outer side of the support portion 14 so as to be fitted to the outer periphery of the flange member 2, a cylindrical portion 16 facing the radially inner portion of the flange member 2, and a coupling portion 17 coupling together the cylindrical portion 16 and the support portion 14 at the axially rearward side of the flange member 2.

The support portion 14 of the support member 3 supports the flange member 2 at a position offset radially outwardly from the position where a load is applied to the flange member 2 (i.e., the load acting surface 6). With this arrangement, the radially inner portion of the flange member 2 is deflected axially rearwardly about the position of the supported surface 10, when a load is applied.

The inner periphery of the cylindrical fitting portion 15 is fitted to the outer periphery of the flange member 2 with an interference fit. This allows the flange member 2 to be integrated with the support member 3, thereby allowing for an easy handling of the magnetic load sensor unit 1.

The magnetic target 4 is fixed to the inner periphery of the flange member 2. The magnetic sensor 5 is fixed to the outer periphery of the cylindrical portion 16 of the support member 3 so that the magnetic sensor faces the magnetic target 4 in the radial direction. A plurality of bearings 18 are mounted in the inner periphery of the cylindrical portion 16 so as to be axially spaced apart from each other.

The magnetic target 4 comprises two permanent magnets 19 each magnetized in the direction (the radial direction, in this instance) perpendicular to the axial direction, in which the magnetic target 4 and the magnetic sensor 5 move relative to each other due to the deflection of the flange member 2. The two permanent magnets 19 are arranged adjacent to each other so that two magnetic poles of the respective permanent magnets 19 having opposite polarities (i.e., the north pole of one of the permanent magnets 19 and the south pole of the other permanent magnets 19) are aligned in the axial direction.

If neodymium magnets are used as the permanent magnets 19, for example, a strong magnetic flux can be generated while taking up little space. However, samarium-cobalt magnets, samarium-iron-nitride magnets, Alnico magnets, ferrite magnets, or praseodymium magnets may also be used as the permanent magnets 19. If samarium-cobalt magnets, samarium-iron-nitride magnets, or Alnico magnets are used, the magnetic flux generated by the permanent magnets 19 is less likely to decrease with a temperature rise of the permanent magnets 19. If praseodymium magnets are used, the mechanical strength of the permanent magnets 19 can be improved.

The magnetic sensor 5 is disposed to face the magnetic target 4 in the direction perpendicular to the axial direction (radial direction in the figures) in the vicinity of the boundary between the adjacent magnetic poles of the two respective permanent magnets 19. The magnetic sensor 5 may be a magnetoresistance element (so-called MR sensor) or a magnetic impedance element (so-called MI sensor). However, a Hall IC is preferably used as the magnetic sensor 5, because it is less expensive, and is suitable for use in an electric brake system since Hall ICs having a high heat resistance are commercially available.

In the magnetic load sensor unit 1, when an axial load is applied to the flange member 2 from forward to rearward as shown by the arrows in FIG. 1, the flange member 2 is deflected axially rearwardly about the radially outer edge portion thereof. As the flange member 2 deflects, the magnetic target 4 and the magnetic sensor 5 move relative to each other in the axial direction. This in turn changes the output signal of the magnetic sensor 5, corresponding to the magnitude of the relative displacement between the magnetic target 4 and the magnetic sensor 5. Thus, by grasping the relationship between the magnitude of the axial load applied to the flange member 2 and the output signal of the magnetic sensor 5 in advance, the magnitude of the axial load applied to the flange member 2 can be detected based on the output signal of the magnetic sensor 5.

When an axial load is applied to the magnetic load sensor unit 1, the relative displacement between the magnetic target 4 and the magnetic sensor 5 is extremely small. For example, if the magnetic load sensor unit 1 is mounted in the electric brake system to be described later, an axial load of 30 kN at maximum is applied to the magnetic load sensor unit 1. At this time, the relative displacement between the magnetic target 4 and the magnetic sensor 5 in the axial direction is about 0.4 mm. Since, in this magnetic load sensor unit 1, the north poles and south poles of the two permanent magnets 19, which are magnetized in the radial direction, are arranged adjacent to each other in the axial direction, a high density magnetic flux intersecting the axial direction exists in the vicinity of the magnetic sensor 5 disposed at the boundary between the north poles the south poles. Thus, the output signal of the magnetic sensor 5 steeply changes in response to the slight relative displacement between the magnetic target 4 and the magnetic sensor 5 in the axial direction. Thus, although the relative displacement between the magnetic target 4 and the magnetic sensor 5 is extremely small, the magnitude of the axial load acting on the flange member 2 can be detected.

Figure 15:
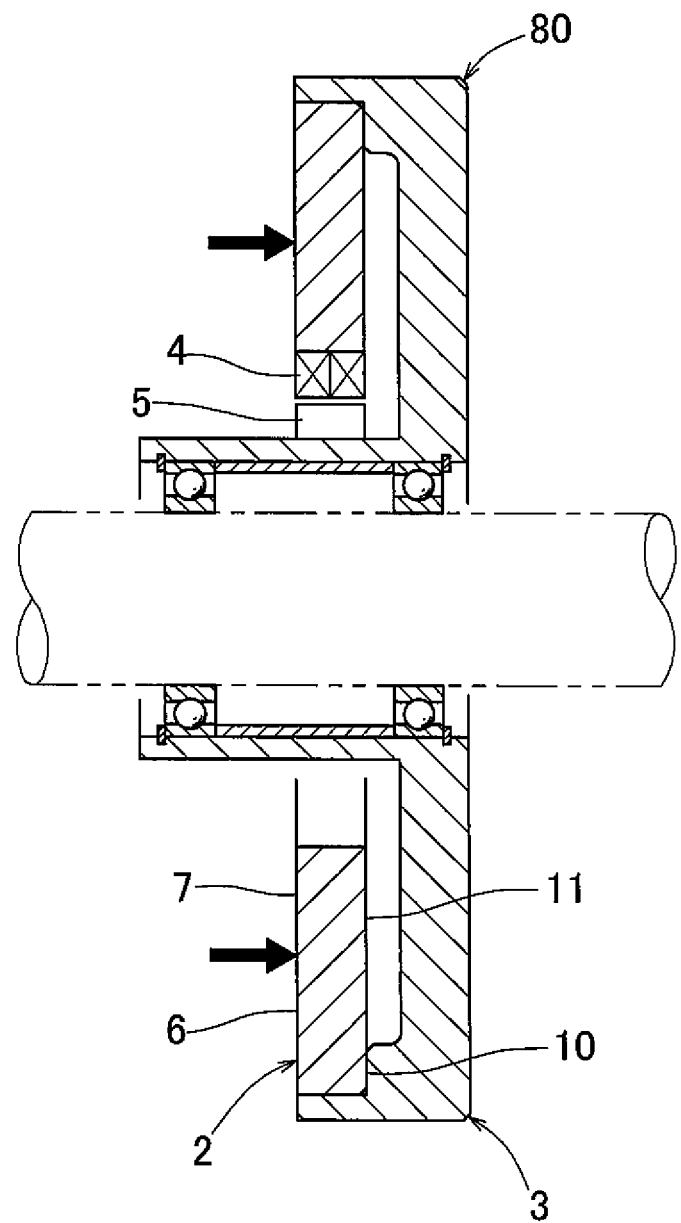
FIG. 15 is a cross sectional view of a magnetic load sensor unit of a comparative example.

FIG. 15 shows a magnetic load sensor unit 80 of the comparative example in comparison with the above embodiment. In the magnetic load sensor unit 80, the load acting surface 6 of the flange member 2 is not offset relative to the axially forward surface 7 of the flange member 2, and the step 8 on the forward surface side of the flange member 2 does not exist. Further, the supported surface 10 of the flange member 2 is not offset relative to the axially rearward surface 11 of the flange member 2, and the step 12 on the rearward surface side of the flange member 2 does not exit. The constitution other than the above is the same as the above embodiment.

FIG. 16(a) shows the displacement analysis result of the magnetic load sensor unit 80 of the comparative example shown in FIG. 15, showing the displacement of various sites of the flange member 2 in the radial direction, when an axial load is applied to the flange member 2 from the axially forward side thereof; and FIG. 16(b) shows the displacement analysis result of the magnetic load sensor unit 1 according to the above embodiment, showing the displacement of various sites of the flange member 2 in the radial direction, when an axial load is applied to the flange member 2 from the axially forward side thereof. The analysis was performed using a 1/36 cut model of the flange member 2.

According to the analysis results, when the load acting surface 6 of the flange member 2 is not offset as shown in FIG. 15, the displacement distribution as shown in FIG. 16(a) is observed. In contrast, when the load acting surface 6 of the flange member 2 is offset as in the above descried embodiment, the load acting surface 6 is scarcely moved in the radial direction as shown in FIG. 16(b), compared with the result shown in FIG. 16(a).

Further, when the supported surface 10 of the flange member 2 is not offset as shown in FIG. 15, the displacement distribution as shown in FIG. 16(a) is observed. In contrast, when the supported surface 10 of the flange member 2 is offset as in the above embodiment, the supported surface 10 is scarcely moved in the radial direction as shown in FIG. 16(b), compared with the result shown in FIG. 16(a).

Thus, when the load acting surface 6 and the supported surface 10 of the flange member 2 are offset, the displacement of the load acting surface 6 and the supported surface 10 in the radial direction can be reduced to a low level, and the reason for this is considered as follows. Specifically, when an axial load is applied to the flange member 2 from the axially forward side, the axially forward surface 7 of the flange member 2 moves radially inwardly and the axially rearward surface 11 of the flange member 2 moves radially outwardly, as shown in FIG. 16(a), but the site between the axially forward surface 7 and the axially rearward surface 11 of the flange member 2 scarcely moves in the radial direction. Since the load acting surface 6 and the supported surface 10 of the flange member 2 are disposed between the axially forward surface 7 and the axially rearward surface 11, the displacement of the load acting surface 6 and the supported surface 10 in the radial direction can be reduced to a low level.

As described above, in the magnetic load sensor unit 1 according to the above embodiment, since the load acting surface 6 of the flange member 2 is offset axially rearwardly relative to the axially forward surface 7 of the flange member 2, the displacement of the load acting surface 6 in the radial direction upon deflection of the flange member 2 can be reduced to a low level. Thus, when a load is applied to the flange member 2, the slippage on the load acting surface 6 is reduced, thereby preventing hysteresis errors due to the slippage on the load acting surface 6, while the load (and thus the degree of deflection of the flange member 2) is increasing and decreasing.

Further, in the magnetic load sensor unit 1, the supported surface 10 of the flange member 2 is offset axially forwardly relative to the axially rearward surface 11 of the flange member 2. Therefore, the displacement of the supported surface 10 in the radial direction upon deflection of the flange member 2 can also be reduced to a low level. Thus, when a load is applied to the flange member 2, the slippage on the supported surface 10 is reduced, thereby preventing hysteresis errors due to the slippage on the supported surface 10, while the load is increasing and decreasing.

When a load is applied to the magnetic load sensor unit 1, a load acts on the flange member 2 to cause deflection in the flange member 2, but it does not act on the magnetic sensor 5. Thus, the magnetic sensor 5 is less likely to malfunction even if an impact load or a load oblique to the axial direction is applied, thereby ensuring a high durability.

In addition, since the flange member 2 and the support member 3 of the magnetic load sensor unit 1 are made of the same material or materials having the same linear expansion coefficient, the flange member 2 and the support member 3 are thermally expanded at the same rate when the temperature rises. As a result, the relative displacement between the magnetic target 4 and the magnetic sensor 5 due to temperature change is less likely to occur, and therefore, errors due to temperature change are less likely to occur.

Figure 4:
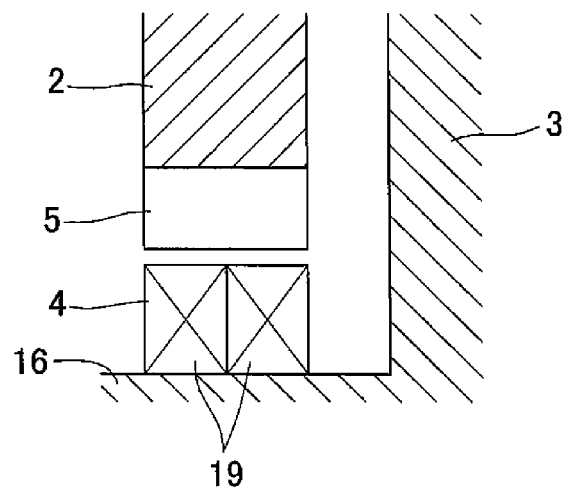
FIG. 4 is an enlarged cross sectional view of a magnetic target and a magnetic sensor shown in FIG. 2, in which they are arranged in a different manner from the arrangement shown in FIG. 2.

Although FIGS. 1 to 3 show the embodiment in which the magnetic target 4 is fixed to the flange member 2, and the magnetic sensor 5 is fixed to the support member 3, the magnetic target 4 and the magnetic sensor 5 may be arranged conversely. Specifically, as shown in FIG. 4, the magnetic sensor 5 may be fixed to the flange member 2, and the magnetic target 4 may be fixed to the support member 3.

Figure 5:
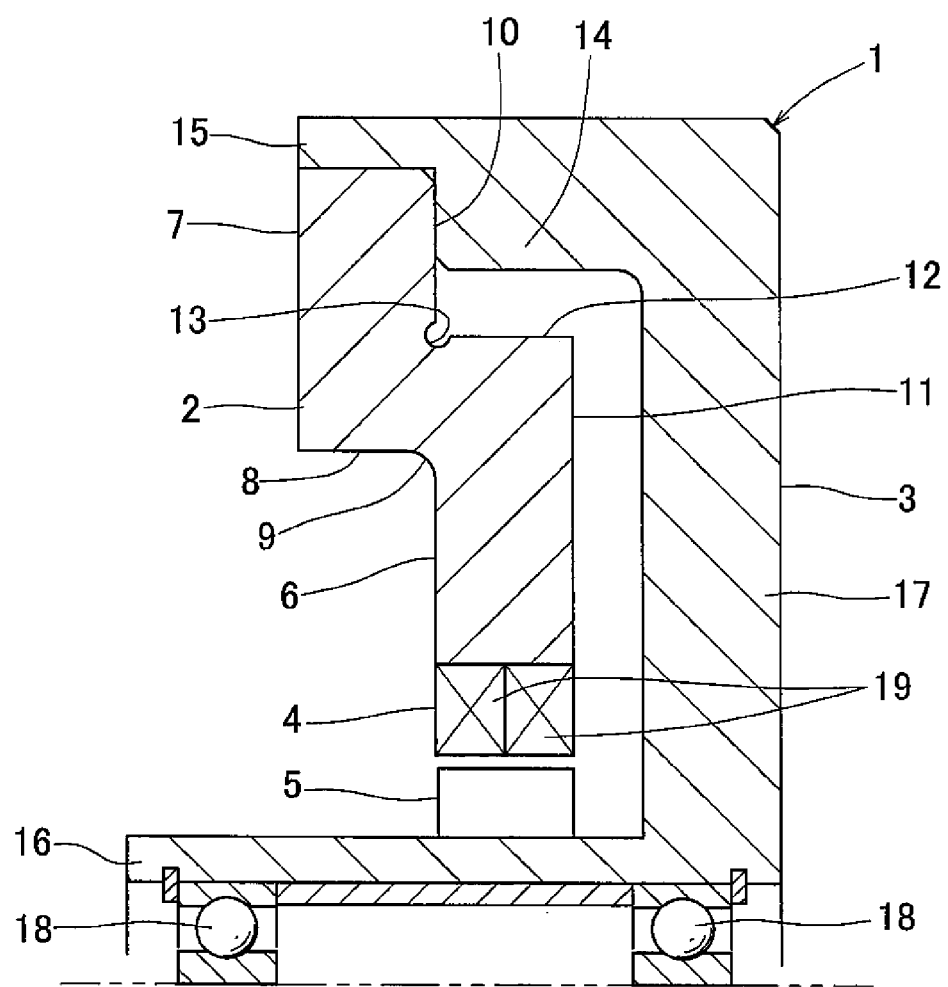
FIG. 5 is an enlarged cross sectional view of another magnetic load sensor unit that is different from one shown in FIG. 2.

As shown in FIG. 5, the load acting surface 6 and the supported surface 10 of the flange member 2 are preferably formed such that both surfaces exist on a single plane. With this arrangement, the slippage on the load acting surface 6 and the slippage on the supported surface 10 when a load is applied to the flange member 2 can be reduced extremely efficiently. As used herein, the expression "to exist on a single plane" does not necessary mean that the load acting surface 6 and the supported surface 6 of the flange member 2 exist precisely on a single plane in a mathematical sense. It merely means that the load acting surface 6 and the supported surface 10 exist within a virtual plane-like region having a thickness of about 10% of the thickness of the portion of the flange member 2 to which a load is applied. As shown in FIG. 5, the load acting surface 6 and the supported surface 10 of the flange member 2 are disposed at the intermediate position which is in equal distance from the axially forward surface 7 and from the axially rearward surface 11 of the flange member 2.

Figure 6:
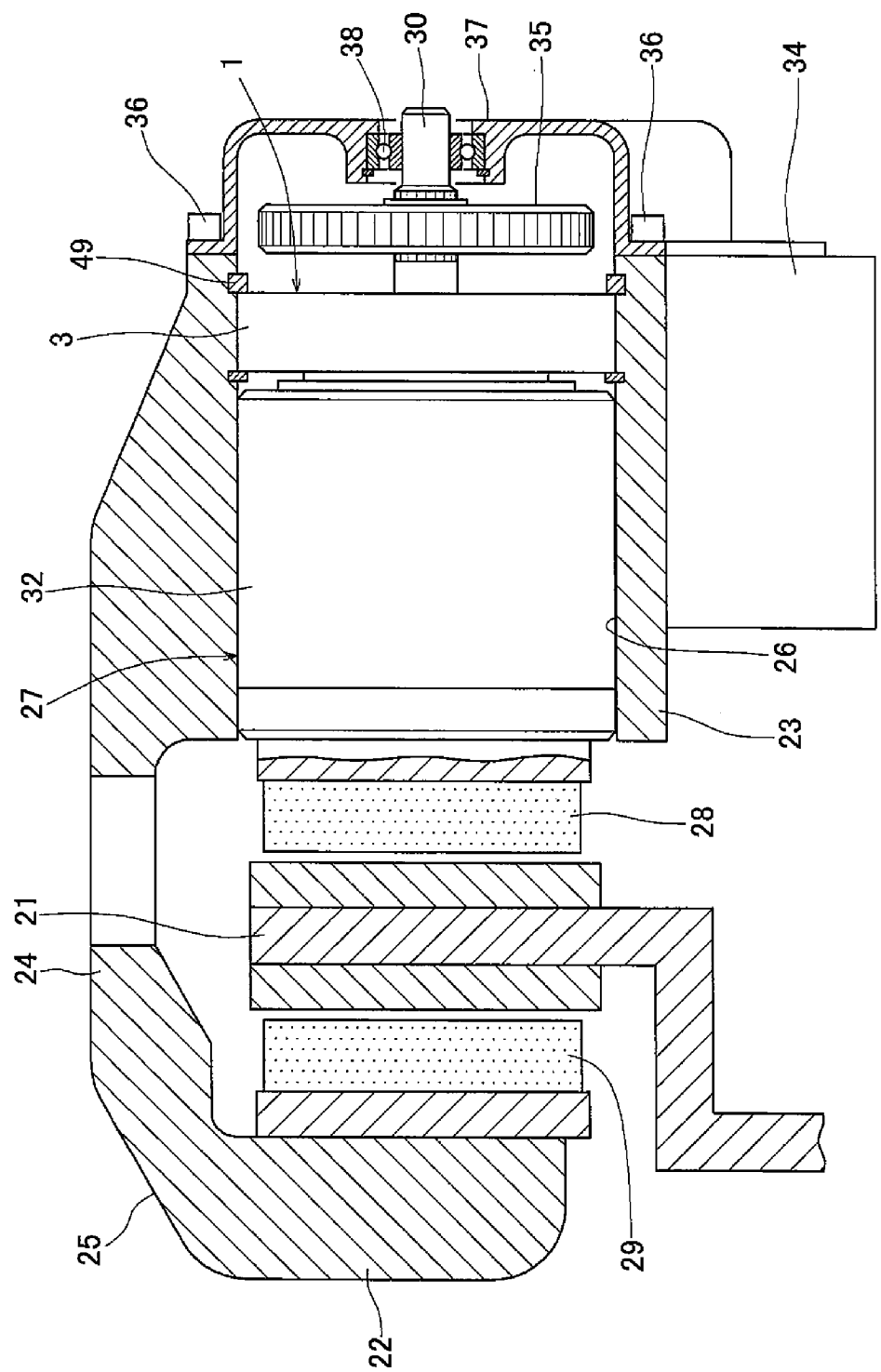
FIG. 6 is a cross sectional view of an electric brake system including the magnetic load sensor unit shown in FIG. 1.
Figure 7:
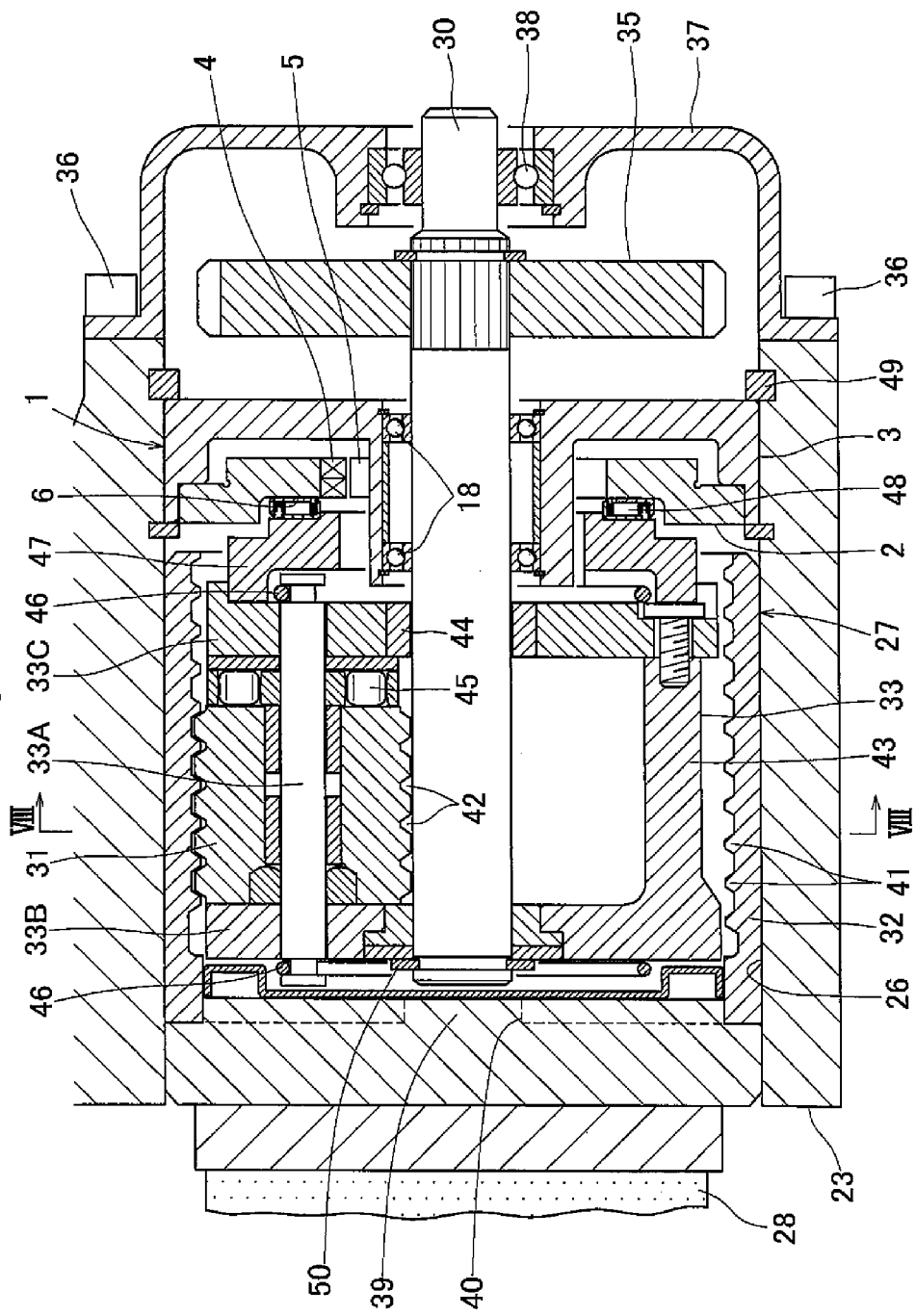
FIG. 7 is an enlarged cross sectional view of the electric brake system shown in FIG. 6, showing the vicinity of the linear motion actuator.
Figure 8:
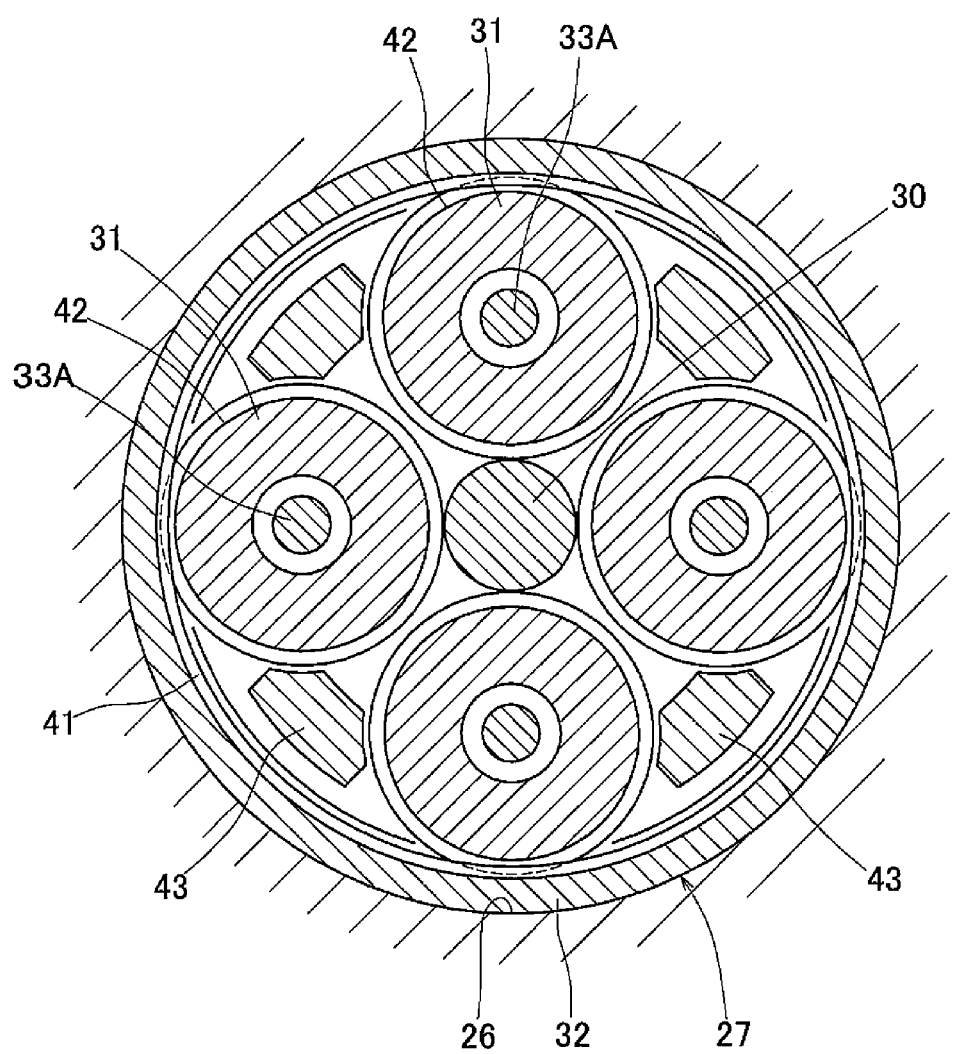
FIG. 8 is a cross sectional view of the electric brake system shown in FIG. 7, taken along the line VIII-VIII.

FIGS. 6 to 8 show an electric brake system including the above described magnetic load sensor unit 1, for use in a vehicle.

This electric brake system comprises a brake disk 21 configured to rotate together with a wheel, a caliper body 25 having opposed pieces 22 and 23 facing each other with the brake disk 21 disposed therebetween and coupled together by a bridge 24; a linear motion actuator 27 mounted in a mounting hole 26 formed in the opposed piece 23 and open to the surface of the opposed piece 23 facing the brake disk 21; and a pair of right and left friction pads 28 and 29.

The friction pad 28 is provided between the opposed piece 23 and the brake disk 21, and is supported by a pad pin (not shown) mounted to the caliper body 25 so as to be movable in the axial direction of the brake disk 21. The other friction pad 29 is mounted to the opposed piece 22 on the other side of the caliper body. The caliper body 25 is slidable in the axial direction of the brake disk 21.

As shown in FIG. 7, the linear motion actuator 27 comprises a rotary shaft 30, a plurality of planetary rollers 31 kept in rolling contact with a cylindrical surface on the outer periphery of the rotary shaft 30, an outer ring member 32 surrounding the planetary rollers 31, a carrier 33 supporting the planetary rollers 31 so as to be rotatable about their respective axes while revolving around the rotary shaft 30, and the magnetic load sensor unit 1, which is disposed axially rearwardly of the outer ring member 32.

The rotary shaft 30 is rotated by receiving the rotation of an electric motor 34 shown in FIG. 6 through a gear 35. The rotary shaft 30 is received in the mounting hole 26 which axially extends through the opposed piece 23, with one end of the rotary shaft 30 protruding from the opening of the mounting hole 26 at the axially rear end of the mounting hole 26. The gear 35 is rotationally fixed to this protruding end of the rotary shaft 30 by means of splines. The gear 35 is covered by a lid 37 fixed in position by bolts 36 to close the opening of the mounting hole 26 at its axially rearward end. A bearing 38 is mounted in the lid 37, and rotatably supports the rotary shaft 30.

As shown in FIG. 8, the planetary rollers 31 are kept in rolling contact with the cylindrical surface on the outer periphery of the rotary shaft 30, such that, when the rotary shaft 30 is rotated, the planetary rollers 31 are also rotated due to friction between the planetary rollers 31 and the rotary shaft 30. The plurality of planetary rollers 31 are circumferentially spaced apart from each other at regular intervals.

As shown in FIG. 7, the outer ring member 32 is mounted in the mounting hole 26 provided in the opposed piece 23 of the caliper body 25, and is supported by the inner wall of the mounting hole 26 so as to be slidable in the axial direction. The outer ring member 32 has on its axially forward end an engaging recess 40 in which an engaging protrusion 39 formed on the rear surface of the friction pad 28 is engaged. Due to the engagement of the engaging protrusion 39 with the engaging recess 40, the outer ring member 32 is rotationally fixed relative to the caliper body 25.

A helical rib 41 is provided on the inner periphery of the outer ring member 32, while the planetary rollers 31 are each provided with circumferential grooves 42 on the outer periphery thereof in which the helical rib 41 is engaged.

Thus, when the planetary rollers 31 are rotated, the outer ring member 32 moves in the axial direction, with the helical rib 41 on the outer ring member 32 guided by the circumferential grooves 42. Although the circumferential grooves 42, having a lead angle of 0°, are provided on the outer peripheries of the planetary rollers 31 in this embodiment, a helical groove having a different lead angle from that of the helical rib 41 may be provided on each planetary roller 31 instead of the circumferential grooves 42.

The carrier 33 comprises carrier pins 33A rotatably supporting the respective planetary rollers 31, an annular carrier plate 33B keeping the axially forward ends of the carrier pins 33A circumferentially spaced apart from each other at regular intervals, and an annular carrier body 33C keeping the axially rearward ends of the carrier pins 33A circumferentially spaced apart from each other at regular intervals. The carrier plate 33B and the carrier body 33C face each other in the axial direction, with the planetary rollers 31 therebetween, and are coupled together through coupling rods 43 extending between the respective circumferentially adjacent pairs of planetary rollers 31.

The carrier body 33C is supported by the rotary shaft 30 through a slide bearing 44 so as to be rotatable relative to the rotary shaft 30. Thrust bearings 45 are mounted between the respective planetary rollers 31 and the carrier body 33C to prevent transmission of rotation of the respective planetary rollers 31 about their axes to the carrier body 33C.

Radially shrinkable ring springs 46 are wrapped around the circumferentially spaced apart carrier pins 33A, biasing the carrier pins radially inwardly. The outer peripheries of the planetary rollers 31 are pressed against the outer periphery of the rotary shaft 30 under the biasing force of the radially shrinkable ring springs 46, thereby preventing slippage between the rotary shaft 30 and the respective planetary rollers 31. The radially shrinkable ring springs 46 are provided at both ends of the carrier pins 33A, so that the biasing forces of the radially shrinkable ring springs 46 are distributed over the entire axial lengths of the respective planetary rollers 31.

The magnetic load sensor unit 1 is fitted in the mounting hole 26 with the support member 3 positioned axially rearwardly of the flange member 2. A spacer 47 and a thrust bearing 48 are mounted between the carrier 33 and the magnetic load sensor unit 1. The spacer 47 is rotatable together with the carrier 33, and the thrust bearing 48 is disposed between the spacer 47 and the magnetic load sensor unit 1 to transmit axial loads therebetween. The thrust bearing 48 is in contact with the load acting surface 6 of the flange member 2, so as to allow axial loads to be applied from the spacer 47 to the load acting surface 6 of the flange member 2 through the thrust bearing 48. The rotary shaft 30 is rotatably supported by bearings 18 mounted in the cylindrical portion 16 of the support member 3.

A snap ring 49 is fitted in the inner periphery of the mounting hole 26, and engages the radially outer edge of the support member 3, preventing axially rearward movement of the magnetic load sensor unit 1. The magnetic load sensor unit 1 axially supports the carrier body 33C through the spacer 47 and the thrust bearing 48, thereby preventing axially rearward movement of the carrier 33. A snap ring 50 is fitted on the rotary shaft 30 at its axially forward end to prevent axially forward movement of the carrier 33. As a result, the carrier 33 is prevented from both axially forward and axially rearward movements, so that the planetary rollers 31, held in position by the carrier 33, are also prevented from axial movement.

The operation of the above described electric brake system will now be described.

When the electric motor 34 is energized, and the rotary shaft 30 is rotated by the electric motor 34, the planetary rollers 31 revolve around the rotary shaft 30 while rotating about the respective carrier pins 33A. This causes the outer ring member 32 and the planetary rollers 31 to move relatively in the axial direction, due to engagement of the helical rib 41 in the circumferential grooves 42. However, since the planetary rollers 31, as well as the carrier 33, are prevented from axial movement, only the outer ring member 32 actually moves in the axial direction, with the planetary rollers 31 kept stationary in the axial direction. Thus, the linear motion actuator 27 converts the rotation of the rotary shaft 30 driven by the electric motor 34 to the axial movement of the outer ring member 32, thereby applying an axial load to the friction pad 28 from the outer ring member 32. Under this axial load, the friction pad 28 is pressed against the brake disk 21, thereby generating a braking force.

When an axial load is applied to the friction pad 28 from the outer ring member 32, an axially rearward reaction force acts on the outer ring member 32. This reaction force is transmitted through the planetary rollers 31, carrier 33, spacer 47, and thrust bearing 48, and received by the magnetic load sensor unit 1. The reaction force thus deflects the flange member 2 of the magnetic load sensor unit 1 axially rearwardly, causing the magnetic target 4 and the magnetic sensor 5 to move relative to each other. This in turn changes the output signal of the magnetic sensor 5, corresponding to the magnitude of the relative displacement between the magnetic target 4 and the magnetic sensor 5. Therefore, the magnitude of the axial load can be detected based on the output signal of the magnetic sensor 5. By performing feedback control of the braking force generated by this electric brake system based on the output signal of the magnetic sensor 5, the control of the load can be performed with high accuracy.

In this electric brake system, a planetary roller mechanism is used as a linear motion mechanism for converting the rotation of the rotary shaft 30 to the axial movement of the outer ring member 32. The planetary roller mechanism comprises: the plurality of planetary rollers 31 kept in rolling contact with the cylindrical surface on the outer periphery of the rotary shaft 30; the carrier 33 supporting the planetary rollers 31 so as to be rotatable about their respective axes while revolving around the rotary shaft 30, and prevented from the axial movement; the outer ring member 32 surrounding the plurality of planetary rollers 31, the helical rib 41 provided on the inner periphery of the outer ring member 32, and the helical groove or circumferential grooves 42 provided on the outer peripheries of the respective planetary rollers 31 so as to engage with the helical rib 41. However, the magnetic load sensor unit 1 can also be mounted in an electric brake system including a different linear motion mechanism.

Figure 9:
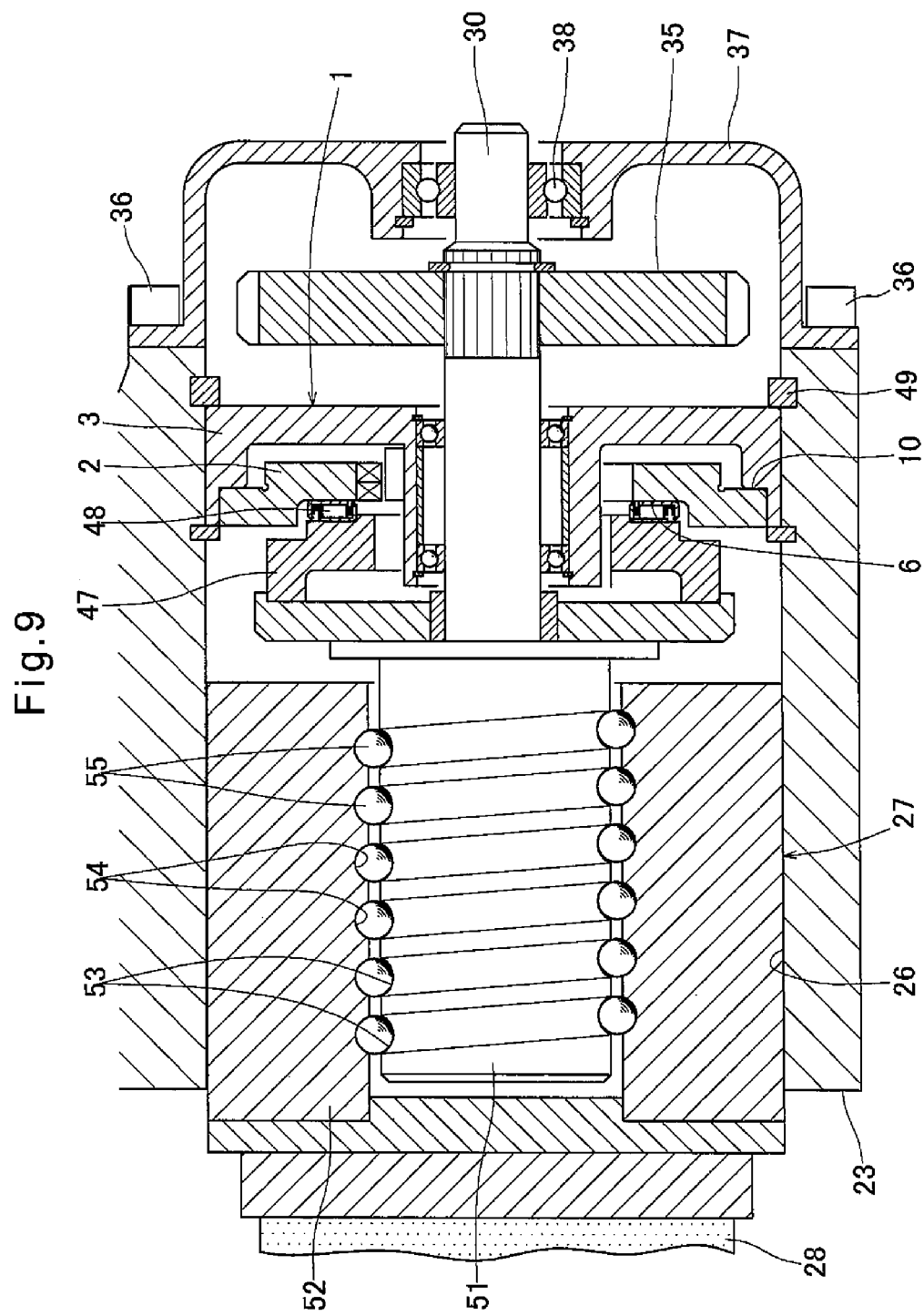
FIG. 9 is a cross sectional view of an electric brake system including a ball screw mechanism instead of a planetary roller mechanism used in the electric brake system shown in FIG. 6.

By way of example thereof, FIG. 9 shows an electric brake system including a ball screw mechanism as the linear motion mechanism. In the following description of FIG. 9, elements of this embodiment corresponding to those of the above embodiment are denoted by the same numerals, and the description thereof is omitted.

As shown in FIG. 9, this linear motion actuator 27 comprises the rotary shaft 30, a threaded shaft 51 integral with the rotary shaft 30, a nut 52 surrounding the threaded shaft 51, a plurality of balls 55 disposed between a thread groove 53 formed on the outer periphery of the threaded shaft 51 and a thread groove 54 formed on the inner periphery of the nut 52, a return tube (not shown) through which the balls 55 are returned from the terminal end to the starting end, of the thread groove 54 of the nut 52, and the magnetic load sensor unit 1, which is disposed axially rearward of the nut 52.

The nut 52 is received in the mounting hole 26 provided in the opposed piece 23 of the caliper body 25 so as to be rotationally fixed and axially slidable, relative to the caliper body 25. The spacer 47 is provided at the axially rearward end of threaded shaft 51 so as to rotate together with the threaded shaft 51. The spacer 47 is supported by the magnetic load sensor unit 1 through a thrust bearing 48. The magnetic load sensor unit 1 axially supports the nut 52 through the spacer 47, thrust bearing 48 and the threaded shaft 51, thereby preventing axially rearward movement of the nut 52.

This electric brake system is configured such that when the rotary shaft 30 is rotated, the threaded shaft 51 and the nut 52 are rotated relative to each other such that the nut 52 moves axially forward, thereby applying an axial load to the friction pad 28. At this time, an axially rearward reaction force is applied to the threaded shaft 51. The reaction force is transmitted through the spacer 47 and the thrust bearing 48, and received by the magnetic load sensor unit 1. The reaction force thus deflects the flange member 2 of the magnetic load sensor unit 1 axially rearwardly, and causes the magnetic target 4 and the magnetic sensor 5 to move relative to each other. This in turn changes the output signal of the magnetic sensor 5 corresponding to the magnitude of the axial load applied to the friction pad 28, in the same manner as in the above embodiment. Thus, the magnitude of the axial load (i.e., the pressing force applied to the friction pad 28) can be detected based on the output signal of the magnetic sensor 5.

Figure 10:
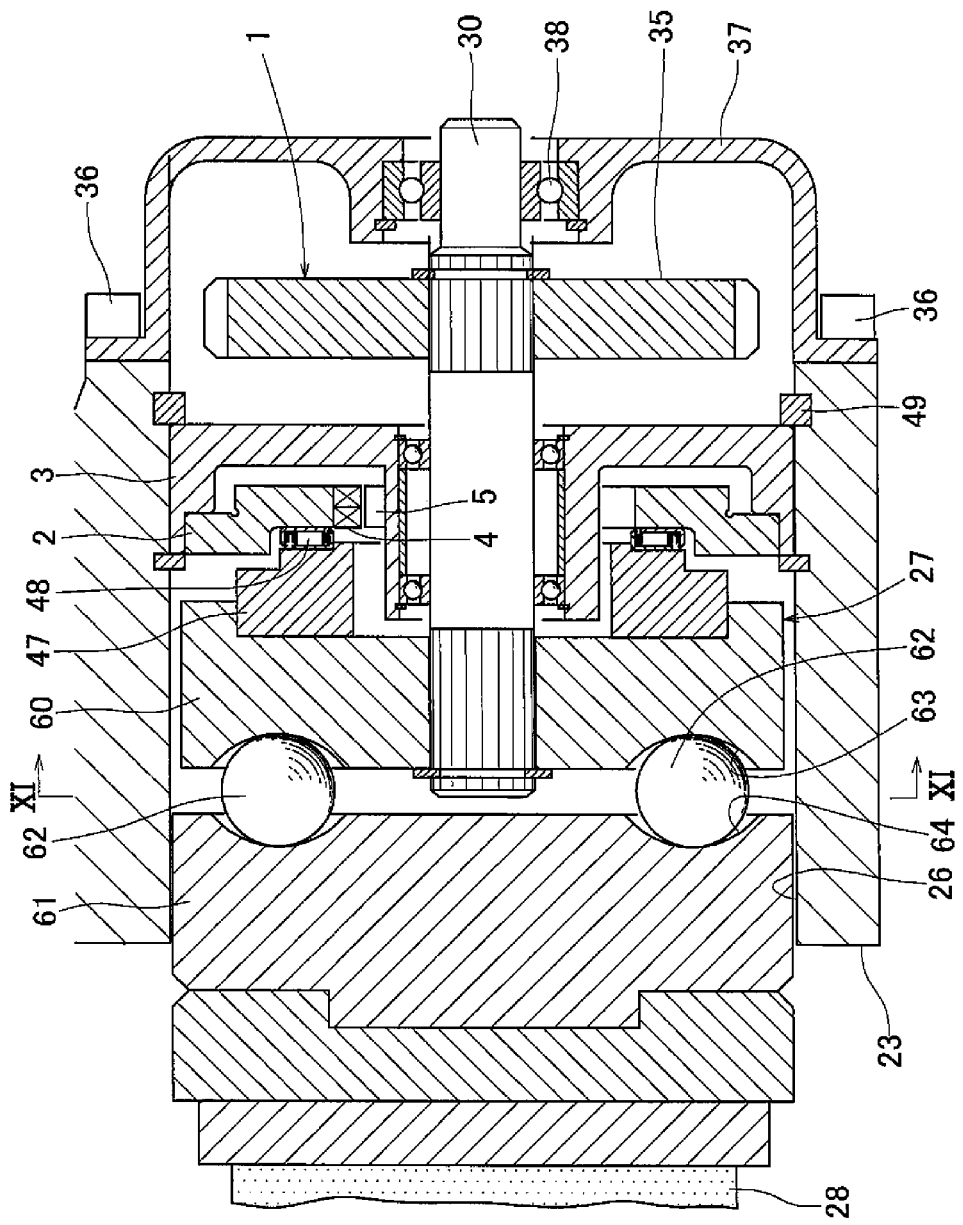
FIG. 10 is a cross sectional view of an electric brake system including a ball ramp mechanism instead of the planetary roller mechanism included in the electric brake system shown in FIG. 6.

FIG. 10 shows an electric brake system including a ball-ramp mechanism as the linear motion mechanism.

The electric brake system shown in FIG. 10 comprises the rotary shaft 30, a rotary disk 60 rotationally fixed to the outer periphery of the rotary shaft 30, a linear motion disk 61 disposed axially forward of the rotary disk 60 and facing the rotary disk 60, a plurality of balls 62 sandwiched between the rotary disk 60 and the linear motion disk 61, and the magnetic load sensor unit 1, which is provided axially rearward of the linear motion disk 61.

The linear motion disk 61 is received in the mounting hole 26 formed in the opposed piece 23 of the caliper body 25 so as to be rotationally fixed and axially slidable, relative to the caliper body 25. The spacer 47 is provided at the axially rearward end of the rotary disk 60 so as to rotate together with the rotary disk 60. The spacer 47 is supported by the magnetic load sensor unit 1 through a thrust bearing 48. The magnetic load sensor unit 1 axially supports the rotary disk 60 through the spacer 47 and the thrust bearing 48, thereby preventing axially rearward movement of the rotary disk 60.

Figure 11:
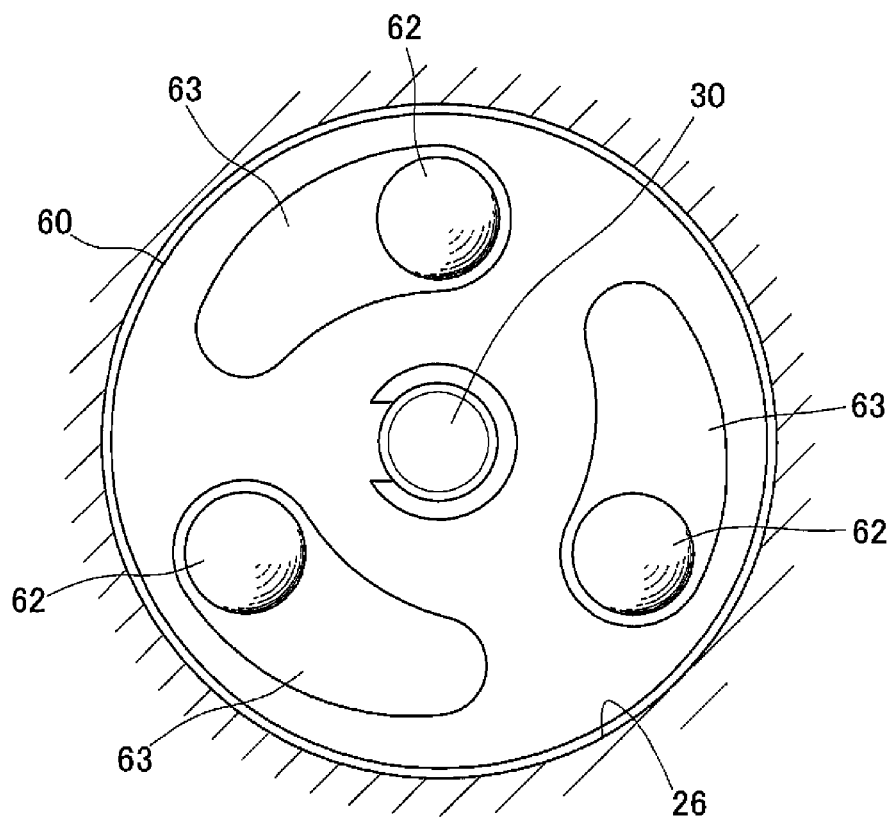
FIG. 11 is a cross sectional view of the electric brake system shown in FIG. 10, taken along the line XI-XI.
Figure 12:
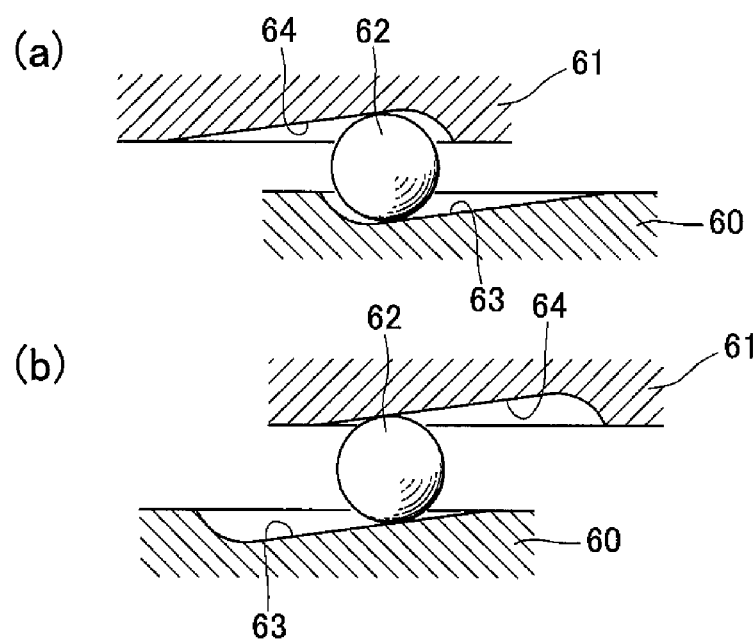
FIG. 12(a) is a view illustrating the relationship between balls and inclined grooves shown in FIG. 11.
FIG. 12(b) is a view illustrating the state in which a rotary disk and a linear motion disk are rotated relative to each other, and the distance between the both disks has increased, from the state shown in FIG. 12(a).

As shown in FIGS. 10 and 11, inclined grooves 63 are formed on the surface of the rotary disk 60 facing the linear motion disk 61 such that the depth of each inclined groove 63 gradually decreases in one of the opposite circumferential directions, while inclined grooves 64 are formed on the surface of the linear motion disk 61 facing the rotary disk 60 such that the depth of each inclined groove 64 gradually decreases in the other of the opposite circumferential directions. As shown in FIG. 12(*a*), the balls 62 are each received between the corresponding pair of the inclined grooves 63 of the rotary disk 60 and the inclined grooves 64 of the linear motion disk 61. As shown in FIG. 12(*b*), when the linear motion disk 61 is rotated relative to the rotary disk 60, the balls 62 roll between the respective pairs of inclined grooves 63 and 64 such that the distance between the rotary disk 60 and the linear motion disk 61 increases.

This electric brake system is configured such that when the rotary shaft 30 is rotated, the linear motion disk 61 and the rotary disk 60 are rotated relative to each other such that the linear motion disk 61 moves axially forward, thereby applying an axial load to the friction pad 28. At this time, an axially rearward reaction force is applied to the rotary disk 60. The reaction force is transmitted through the spacer 47 and the thrust bearing 48, and received by the magnetic load sensor unit 1. The reaction force thus deflects the flange member 2 of the magnetic load sensor unit 1 axially rearwardly, changing the relative position between the magnetic target 4 and the magnetic sensor 5. This in turn changes the output signal of the magnetic sensor 5 corresponding to the magnitude of the axial load applied to the friction pad 28, in the same manner as in the above embodiment. Thus, the magnitude of the axial load (i.e., the pressing force applied to the friction pad 28) can be detected based on the output signal of the magnetic sensor 5.

Figure 13:
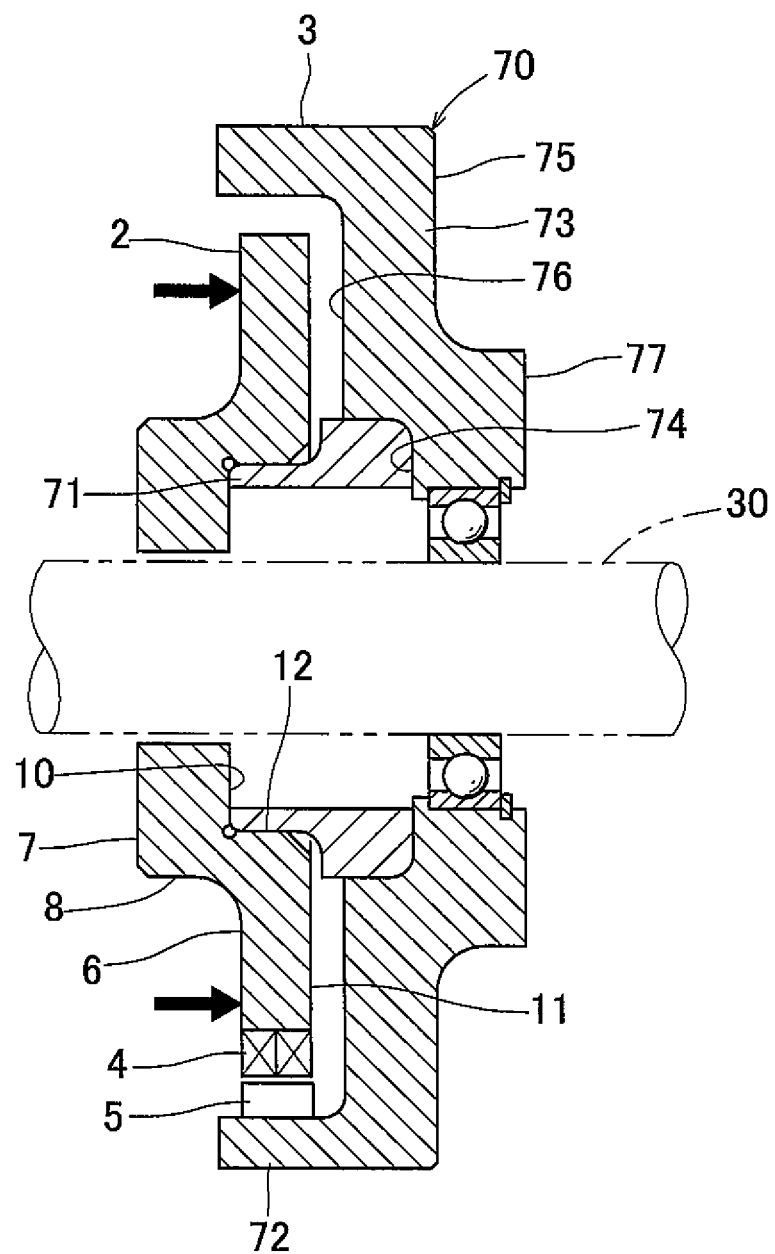
FIG. 13 is a cross sectional view of a magnetic load sensor unit according to a second embodiment of the present invention.

FIG. 13 shows a magnetic load sensor unit 70 according a second embodiment of the present invention. Elements corresponding to those of the first embodiment are denoted by the same numerals, and the description thereof is omitted.

A load acting surface 6 to which a load is applied is provided on the axially forward surface 7 of the radially outer portion of the flange member 2. The load acting surface 6 is a flat surface perpendicular to the axial direction, and is formed at a position offset axially rearwardly relative to the axially forward surface 7 of the portion of the flange member 2 supported by the support member 3.

A supported surface 10 is provided on the axially rearward surface of the radially outer portion of the flange member 2, and is supported by the support member 3. The supported surface 10 is a flat surface perpendicular to the axial direction, and is formed at a position offset axially forwardly relative to the axially rearward surface 11 of the portion of the flange member 2 to which a load is applied.

The support member 3 comprises an annular support portion 71 supporting the axially rearward surface of the radially inner portion of the flange member 2, a cylindrical portion 72 facing the radially outer end of the flange member 2, and a coupling portion 73 coupling together the cylindrical portion 72 and the support portion 71 at the axially rearward side of the flange member 2. The coupling portion 73 has its radially inner portion offset axially rearwardly, forming a stepped portion. The outer periphery of the axially rearward end of the support portion 71 is fitted in the inner periphery of the stepped portion of the coupling portion 73 with an interference fit such that the support portion 71 is fixed to the coupling portion 73. The axially forward end of the support portion 71 is fitted to the inner periphery of the stepped portion 12 on the rearward surface side of the flange member 2 with an interference fit.

The coupling portion 73 of the support member 3 includes, on the axially forward surface of the radially inner portion thereof, a contact surface 74 in contact with the support portion 71. The coupling portion 73 of the support member 3 includes, on the axially rearward surface of the radially outer portion thereof, a mounting surface 75. The contact surface 74 is formed at a position offset axially rearwardly relative to an axially forward surface 76 of the coupling portion 73. The mounting surface 75 is formed at a position offset axially forwardly relative to an axially rearward surface 77 of the coupling portion 73.

The magnetic target 4 is fixed to the outer periphery of the flange member 2. The magnetic sensor 5 is fixed to the inner periphery of the cylindrical portion 72 of the support member 3 so as to face the magnetic target 4 in the radial direction.

The support portion 71 of the support member 3 supports the flange member 2 at a position offset radially inwardly from the portion where a load is applied to the flange member 2 (i.e., the load acting surface 6). With this arrangement, when a load is applied to the flange member 2, the radially outer portion of the flange member 2 is deflected axially rearwardly about the supported surface 10.

In the magnetic load sensor unit 70, when an axial load is applied to the flange member 2 from the axially forward side to the rearward side as shown by arrows in FIG. 13, the flange member 2 is deflected axially rearwardly about the radially inner portion, and the support member 3 is also deflected axially rearwardly about the radially outer end portion. The deflection of both the flange member 2 and the support member 3 causes the magnetic target 4 and the magnetic sensor 5 to move relative to each other in the axial direction. This in turn changes the output signal of the magnetic sensor 5 corresponding to the magnitude of the relative displacement between the magnetic target 4 and the magnetic sensor 5. Thus, since not only the flange member 2 but also the support member 3 is deflected when an axial load is applied to the flange member 2, the magnitude of the relative displacement between the magnetic target 4 and the magnetic sensor 5 is increased, thereby allowing the detection of the load with high resolution.

The load acting surface 6 of the flange member 2 of this magnetic load sensor unit 70 is offset axially rearwardly relative to the axially forward surface 7 of the flange member 2, in the same manner as in the first embodiment. Therefore, the displacement of the load acting surface 6 in the radial direction upon deflection of the flange member 2 can be reduced to a low level. Thus, when a load is applied to the flange member 2, slippage on the load acting surface 6 is reduced, thereby preventing hysteresis errors due to slippage on the load acting surface 6, while the load is increasing and decreasing.

Further, since the supported surface 10 of the flange member 2 of the magnetic load sensor unit 70 is offset axially forwardly relative to the axially rearward surface 11 of the flange member 2, in the same manner as in the first embodiment, the displacement of the supported surface 10 in the radial direction upon deflection of the flange member 2 can be reduced to a low level. Thus, when a load is applied to the flange member 2, slippage on the supported surface 10 is reduced, thereby preventing hysteresis errors due to slippage on the supported surface 10, while the load is increasing and decreasing.

Still further, since the contact surface 74 and the mounting surface 75 of the support member 3 are also offset relative to each other in the same manner as with the flange member 2, slippage on the contact surface 74 and the mounting surface 75 of the support member 3 can also be reduced when a load is applied to the flange member 2, thereby preventing hysteresis errors due to slippage on the contact surface 74 and the mounting surface 75.

Figure 14:
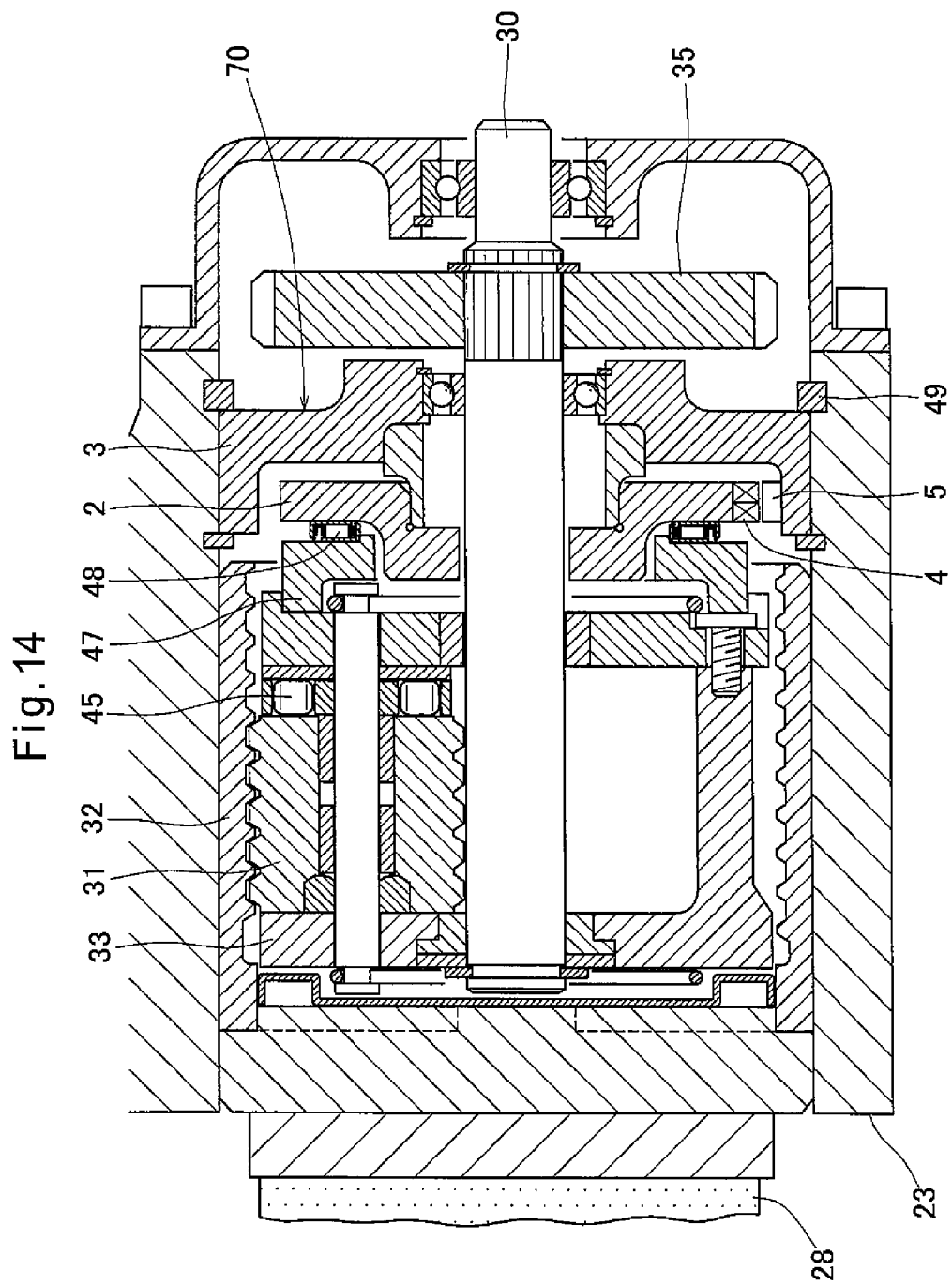
FIG. 14 is a cross sectional view of an electric brake system including the magnetic load sensor unit shown in FIG. 13.

As shown in FIG. 14, the magnetic load sensor unit 70 according to the second embodiment can also be mounted in an electric brake system for a vehicle, in the same manner as in the first embodiment.

DESCRIPTION OF SYMBOLS 1 magnetic load sensor unit
2 flange member
3 support member
4 magnetic target
5 magnetic sensor
6 load acting surface
7 axially forward surface
8 step
9 corner R portion
10 supported surface
11 axially rearward surface
12 step
13 recessed groove
14 support portion
15 fitting cylindrical portion
19 permanent magnet
70 magnetic load sensor unit

The invention claimed is:

1. A magnetic load sensor unit comprising:
a flange member configured to be deflected when a load is applied to the flange member from an axially forward side;
a support member supporting the flange member from an axially rearward side at a position radially offset from a position where the load is applied;
a magnetic target which generates a magnetic flux; and
a magnetic sensor for detecting the magnetic flux generated by the magnetic target;
wherein one of the magnetic target and the magnetic sensor is fixed to the flange member and the other of the magnetic target and the magnetic sensor is fixed to the support member such that the magnetic target and the magnetic sensor move relative to each other due to deflection of the flange member when the load is applied to the flange member, whereby a magnitude of the load is detected based on the magnetic flux detected by the magnetic sensor,
characterized in that the flange member is formed with a load acting surface to which the load is applied at a position offset axially rearwardly relative to an axially forward surface of a portion of the flange member supported by the support member.

2. The magnetic load sensor unit according to claim 1, wherein the flange member has a supported surface supported by the support member and formed at a position offset axially forwardly relative to an axially rearward surface of a portion of the flange member to which the load is applied.

3. The magnetic load sensor unit according to claim 2, wherein the supported surface of the flange member, which is supported by the support member, and the axially rearward surface of the portion of the flange member to which the load is applied are two flat surfaces connected together through a step.

4. The magnetic load sensor unit according to claim 2, wherein the load acting surface of the flange member, to which the load is applied, and the supported surface of the flange member, which is supported by the support member, exist on a same plane.

5. The magnetic load sensor unit according to claim 2, wherein the load acting surface of the flange member, to which the load is applied, and the axially forward surface of the portion of the flange member supported by the support member are two flat surfaces connected together through a step, and wherein the supported surface of the flange member, which is supported by the support member, and the axially rearward surface of the portion of the flange member to which the load is applied are two flat surfaces connected together through a step.

6. The magnetic load sensor unit according to claim 5, wherein the load acting surface of the flange member, to which the load is applied, and the supported surface of the flange member, which is supported by the support member, exist on a same plane.

7. The magnetic load sensor unit according to claim 1, wherein the load acting surface of the flange member, to which the load is applied, and the axially forward surface of the portion of the flange member supported by the support member are two flat surfaces connected together through a step.

8. The magnetic load sensor unit according to claim 7, wherein a rounded corner portion having a circular arc-shaped cross section is formed between, and smoothly connects together, the load acting surface of the flange member and the step on a forward surface side of the flange member.

9. The magnetic load sensor unit according to claim 1, wherein the supported surface of the flange member, which is supported by the support member, and the axially rearward surface of the portion of the flange member to which the load is applied are two flat surfaces connected together through a step.

10. The magnetic load sensor unit according to claim 9, wherein a recessed groove having a circular arc-shaped cross section is formed at a position where the supported surface of the flange member intersects the step on a rearward surface side of the flange member.

11. The magnetic load sensor unit according to claim 1, wherein the load acting surface of the flange member, to which the load is applied, and the supported surface of the flange member, which is supported by the support member, exist on a same plane.

12. The magnetic load sensor unit according to claim 1, wherein the magnetic target comprises a plurality of permanent magnets aligned in an axial direction, wherein the magnetic target and the magnetic sensor are configured to be movable relative to each other in the axial direction, wherein the permanent magnets are magnetized in a direction perpendicular to the axial direction, and wherein the magnetic sensor is disposed in a vicinity of a boundary between adjacent magnetic poles of the permanent magnets.

13. The magnetic load sensor unit according to claim 1, wherein the support member comprises an annular support portion supporting an axially rearward surface of a radially outer edge portion of the flange member, and a cylindrical fitting portion provided on a radially outer side of the support portion so as to be fitted to an outer periphery of the flange member with an interference fit.

14. An electric brake system comprising the magnetic load sensor unit according to claim 1.

* * * * *